US007262257B2

(12) United States Patent
Chung et al.

(10) Patent No.: US 7,262,257 B2
(45) Date of Patent: Aug. 28, 2007

(54) TELECHELIC POLYMERS CONTAINING REACTIVE FUNCTIONAL GROUPS

(75) Inventors: Tze-Chiang Chung, State College, PA (US); Han Hong, State College, PA (US); Masahiko Oka, Mahwah, NJ (US); Katsuyoshi Kubo, Rye, NY (US)

(73) Assignees: The Penn State Research Foundation, University Park, PA (US); The Daikin Institute of Advanced Chemistry and Technology, Int., Orangeburg, NY (US)

( * ) Notice: Subject to any disclaimer, the term of this patent is extended or adjusted under 35 U.S.C. 154(b) by 286 days.

(21) Appl. No.: 10/778,098

(22) Filed: Feb. 17, 2004

(65) Prior Publication Data

US 2005/0182208 A1 Aug. 18, 2005

(51) Int. Cl.
*C08F 4/44* (2006.01)

(52) U.S. Cl. .................. 526/134; 526/317.1; 526/242; 526/255

(58) Field of Classification Search ................ 526/134, 526/317.1, 242, 255
See application file for complete search history.

(56) References Cited

U.S. PATENT DOCUMENTS

| | | | |
|---|---|---|---|
| 5,286,800 A | 2/1994 | Chung et al. | |
| 5,401,805 A | 3/1995 | Chung et al. | |
| 6,248,837 B1 | 6/2001 | Chung et al. | |
| 6,355,749 B1 | 3/2002 | Chung et al. | |
| 6,420,502 B1 * | 7/2002 | Chung | 526/196 |
| 6,479,600 B2 | 11/2002 | Chung et al. | |
| 6,515,088 B2 | 2/2003 | Chung | |
| 2002/0198338 A1 | 12/2002 | Chung | |

OTHER PUBLICATIONS

Otsu et al., *Macromol chem., Rapid Commun.*, 3, 133, 1982.
Otsu et al., *Eur. Polym. J.*, 25, 643, 1989.
Matyjaszewski, et al., *Macromolecules*, 28, 7901, 1995.
Matyjaszewski, et al., *J. Am. Chem. Soc.*, 117, 5614, 1995.
Chung, et al., *Macromolecules*, 26, 3467, 1993.
Chung, et al., *Macromolecules*, 31, 5943, 1998.
Chung, et al., *J. Am. Chem. Soc.*, 121, 6763, 1999.
Chung, et al., *J. Am. Chem. Soc.*, 118, 705, 1996.
Chung, et al., 1996 *Macromolecules*, 32, 2525, 1999.
Chung, et al *Polymer*, 38, 1495, 1997.
Mulhaupt et al., *Polymers for Advanced Technologies*, 4, 439, 1993.
Shiono et al., *Macromolecules*, 25, 3356, 1992.
Shiono et al., *Macromolecules*, 26, 2085, 1993.
Shiono et al., *Macromolecules*, 30, 5997, 1997.
Chung, et al., *Macromolecules* 32, 8689, 1999.
Chung, et al., *Macromolecules* 34, 8040, 2001.
Chung, et al., *J. Am. Chem. Soc.* 123, 4871, 2001.
Chung, et al., *Macromolecules* 35, 1622, 2002.
D. E. Bergbreiter et al., *J. Am. Chem. Soc.*, 109, 174, 1987.
R. H. Grubbs, et al., *Macromolecules*, 22, 1558, 1989.
Y. Doi, et al., *Makromol. Chem.*, 188, 1273, 1987.
H. Yasuda, et al., *Macromolecules*, 25, 5115, 1992.
H. Brown et al., *Tetrahedron*, 33, 2331, 1977.

* cited by examiner

*Primary Examiner*—Robert D. Harlan
(74) *Attorney, Agent, or Firm*—McDermott Emery & Will LLP

(57) ABSTRACT

Telechelic polymers having two reactive functional groups at the same polymer chain end are disclosed. These polymers can be prepared by combining a cycloborane initiator, at least one free radical polymerizable monomer and oxygen to form a polymer segment having a borane residue at one end of the polymer segment resulting from the cycloborane initiator; and converting the borane residue to at least two functional groups to form the telechelic polymer.

10 Claims, 3 Drawing Sheets

TELECHELIC POLYMERS CONTAINING REACTIVE FUNCTIONAL GROUPS

CROSS REFERENCE TO RELATED APPLICATION

The present application may contain subject matter similar to U.S. application Ser. No. 10/778,112, filed Feb. 17, 2004, entitled "Functional Fluoropolymers and Processes Therefor", U.S. Pat. No. 6,911,509.

FIELD OF THE DISCLOSURE

The present invention relates to telechelic polymers having reactive functional groups and their preparation. In particular, the present invention relates to the preparation of polymers having two functional groups on one end of the polymer by cycloborane initiators. The processes disclosed herein are applicable to the preparation of the telechelic block polymers with controlled copolymer composition, and narrow molecular weight distribution.

BACKGROUND

Telechelic polymers, possessing reactive functional group(s) situated at the polymer chain end(s), are an importance class of polymeric materials. They find applications as prepolymers for inclusion into final products with well-specified properties by the reaction of their functional groups. One early example of the commercial use of such telechelic polymers is in the formation of polyurethanes, which can be perpared by coupling reaction between hydroxyl-terminated prepolymers with diisocyanates. This example introduced new perspectives on making materials with a wide array of physical properties by controlling the molecular architecture of the polymers.

Originally a telechelic polymer was considered a polymer containing two reactive end-groups, one group at each end. As the use for such materials has grown, so too has the definition of materials classified as telechelic polymers. The current broad definition of telechelic polymers include all polymers that contain one or more reactive end-group(s), which can undergo chemical reactivity with itself or another functional group in another molecule. The polymer that possesses only one reactive end-group is now referred to as a "monotelechelic" and the original telechelic having two opposing reactive end-groups is commonly called a "ditelechelic". Those telechelic polymers having more than two reactive end-groups are designated as tritelechelic, tetratelechelic, or polytelechelic. By far, the most important commercial telechelic polymers are monotelechelic and ditelechelic polymers. These materials serve as prepolymers for preparing well-defined graft copolymers and multi-block copolymers, respectively. Telechelic polymers with higher functionality (greater than 2) usually result in materials having a polymer network structure. An important consideration in the use of telechelic polymers is their average functionality, i.e., the average functionality of a monotelechelic polymer should be 1.0 and that of a ditelechelic polymer should be 2.0. Typically end-group linking reactions are highly sensitive to accurate end group stoichiometry. The quality of graft and multi-block copolymers employing telechelics depend upon the preciseness of their functionality, 1.0 and 2.0, respectively.

Most monotelechelic vinyl polymers are prepared by terminating living polymers with suitable reagents. Practically all vinyl polymerization mechanisms, including anionic, cationic, free radical, metathesis, and Ziegler-Natta, have shown living polymerizations with stable propagating active sites that can be converted to a desired functional group at the chain end.

In many respects, free radical polymerization is the most important commercial process of producing vinyl polymers. However, the facile radical coupling and disproportional reactions offer little or no control over the propagating sites. Early attempts to realize a living free radical polymerization involved the concept of reversible termination of the growing polymer chains by iniferters, such as N,N-diethyldithiocarbamate derivatives (Otsu, et al., *Macromol chem., Rapid Commun.,* 3, 133, 1982, *Eur. Polym. J.,* 25, 643, 1989). The first robust living radical polymerization was observed in reaction involving a stable nitroxyl radical, such as 2,2,6,6-tetramethylpiperidinyl-1-oxy (TEMPO), that does not react with monomers but forms a reversible end-capped propagating chain end (see, Georges, et al., U.S. Pat. Nos. 5,322,912 and 5,401,804). The formed covalent bonds reduce the overall concentration of free radical chain ends, which leads to a lower occurrence of unwanted coupling and disproportionation termination reactions. For an effective polymerization, the reaction has to be carried out at an elevated temperature (>100° C.). Relatively high energy is needed in the cleavage of the covalence bond, which maintains a sufficient concentration of propagating radicals for monomer insertion. This living radical polymerization, however, appears effective only with styrenic monomers.

Subsequently, several research groups have replaced the stable nitroxyl radical with transition metal species as the capping agents to obtain a variety of copper, nickel, iron, cobalt, or ruthenium-mediated living free radical systems, by so-called atom transfer radical polymerization (ATRP) (see, Matyjaszewski, et al., *Macromolecules,* 28, 7901, 1995, *J. Am. Chem. Soc.,* 117, 5614, 1995). All of these systems have an apparent central theme, i.e., reversible termination via equilibrium between active and dormant chain end at an elevated temperature, which is regulated by a redox reaction involving metal ions. The main advantage of this reaction is that, through a proper choice of the metal compound, it is possible to operate with a broad spectrum of monomers. However, a major drawback is the formation of a deep colored reaction mixture that requires extensive purification procedures to obtain a desired final product free of coloration.

Other groups have been focusing on another type of living radical initiators, which can initiate living radical polymerization at ambient temperature and form white polymer products. The chemistry was based on the mono-oxidation adducts of trialkylborane as the living radical initiator. The research objective was centered around the functionalization of polyolefins by first incorporating borane groups into a polymer chain, which was then selectively oxidized by oxygen to form the mono-oxidized borane moieties that initiate free radical graft-form polymerization at ambient temperature to produce polyolefin graft and block copolymers (Chung, et al., U.S. Pat. Nos. 5,286,800 and 5,401,805, *Macromolecules*, 26, 3467, 1993, *Macromolecules*, 31, 5943, 1998, *J. Am. Chem. Soc.,* 121, 6763 (1999)). Several years ago, several relatively stable radical initiators were discovered, which exhibited living radical polymerization characteristics, with a linear relationship between polymer molecular weight and monomer conversion and produced block copolymers by sequential monomer addition (see Chung, et al., U.S. Pat. Nos. 6,420,502 and 6,515,088, *J. Am. Chem. Soc.,* 118, 705, 1996).

A relatively new method was reported for preparing monotelechelic polypropylene by chemical modification of chain end unsaturated polypropylene (PP) that can be prepared by metallocene polymerization or thermal degradation of high molecular weight PP. (see Chung et al., *Macromolecules*, 32, 2525, 1999; *Polymer*, 38, 1495, 1997; Mulhaupt et al., *Polymers for Advanced Technologies*, 4, 439, 1993; and Shiono et al., *Macromolecules*, 25, 3356, 1992; *Macromolecules*, 26, 2085, 1993; *Macromolecules*, 30, 5997, 1997). Recently, Chung et al. have also reported a facile route to prepare monotelechelic polyolefins containing a reactive functional group (OH, COOH, $NH_2$, etc.). The chemistry is centered on an in situ chain transfer reaction during metallocene-mediated α-olefin polymerization using two reactive chain transfer (CT) agents, including dialkylborane ($R_2B$—H) and styrenic molecule/$H_2$, to form polyolefin containing a reactive alkylborane and styrenic terminal group, respectively. (see Chung et al., U.S. Pat. Nos. 6,248,837 and 6,479,600, *J. Am. Chem. Soc*. 121, 6763, 1999, *Macromolecules* 32, 8689, 1999, *Macromolecules* 34, 8040, 2001, *J. Am. Chem. Soc*. 123, 4871, 2001, and *Macromolecules* 35, 1622, 2002). With an appropriate choice of metallocene catalyst, the monotelechelic polyolefin formed shows narrow molecular weight distribution (MW/Mn of 2) and the polymer molecular weight was inversely proportional to the molar ratio of (CT agent)/(α-olefin).

In general, the synthesis of telechelic polymers with a reactive functional group at either chain ends, i.e. "ditelechelic" polymers with functionality of 2, are much more demanding, especially in preparing vinyl polymers. Most of the commercial ditelechelic polymers, such as aliphatic polyesters with two opposing terminal acid or alcohol groups and polyethylene oxide and polypropylene oxide with two opposing terminal alcohol groups, are prepared by polycondensation reaction and ring opening polymerization with suitable initiators, respectively. The preparation of ditelechelic vinyl polymers usually requires the combination of living polymerization and difunctional initiators or functionally substituted initiators. This methodology has been applied to practically all vinyl polymerization techniques, including anionic, cationic, free radical, metathesis, and Ziegler-Natta, which evidence living polymerizations with stable propagating active sites that can be converted to the desired functional group at the chain end. (For examples of anionic living polymerization, see, e.g., U.S. Pat. No. 3,265,765 and D. E. Bergbreiter et al., *J. Am. Chem. Soc.*, 109, 174, 1987; for cationic living polymerization, see, e.g., U.S. Pat. No. 4,946,899; for free radical living polymerization, see Georges, et al., U.S. Pat. Nos. 5,322,912 and 5,401,804, Matyjaszewski, et al., *Macromolecules*, 28, 7901, 1995 and *J. Am. Chem. Soc.*, 117, 5614, 1995; for metathesis living polymerization, see, e.g., R. H. Grubbs, et al., *Macromolecules*, 22, 1558, 1989; and for transition metal living polymerization, see, e.g., Y. Doi, et al., *Makromol. Chem.*, 188, 1273, 1987, and H. Yasuda, et al., *Macromolecules*, 25, 5115, 1992.).

There are also reports describing the preparation of several ditelechelic vinyl polymers by degradation of the polymer that contains some unsaturation units in the polymer backbone. However, it is believed that no one has reported the preparation of ditelechelic polymers containing reactive functional groups at the same polymer chain end. Hence, there is a continuing need for convenient methods for the synthesis of telechelic polymers having varied chemistry.

SUMMARY OF THE DISCLOSURE

An advantage of the present invention is a new class of telechelic polymers and their preparation.

Additional advantages, and other features of the present invention will be set forth in the description which follows and in part will become apparent to those having ordinary skill in the art upon examination of the following or may be learned from the practice of the present disclosure. The advantages may be realized and obtained as particularly pointed out in the appended claims.

According to the present invention, the foregoing and other advantages are achieved in part by a process for preparing a telechelic polymer containing two reactive functional groups at one end of the polymer. The process comprises combining a cycloborane initiator, at least one free radical polymerizable monomer and oxygen. The initiator starts the polymerization of the monomer to form a polymer segment having a borane residue at one end of the segment. The residue is the result of the cycloborane initiator. Polymerization continues until all of the monomer is incorporated into the polymer segment or until the reaction is halted. The terminal borane residue can be converted to at least two functional groups to form the telechelic polymer having at least two functional groups at the same chain end.

Another advantage of the present invention is a telechelic polymer comprising a polymer segment derived from free radical polymerizable monomers and having two functional groups at the same chain end.

Additional advantages of the present invention will become readily apparent to those skilled in this art from the following detailed description, wherein only the preferred embodiments of the present invention are shown and described, simply by way of illustration but not limitation. As will be realized, the invention is capable of other and different embodiments, and its several details are capable of modification in various obvious respects, all without departing from the spirit of the present invention. Accordingly, the drawings and description are to be regarded as illustrative in nature, and not as restrictive.

DETAILED DESCRIPTION OF THE DISCLOSURE

Figure 1:
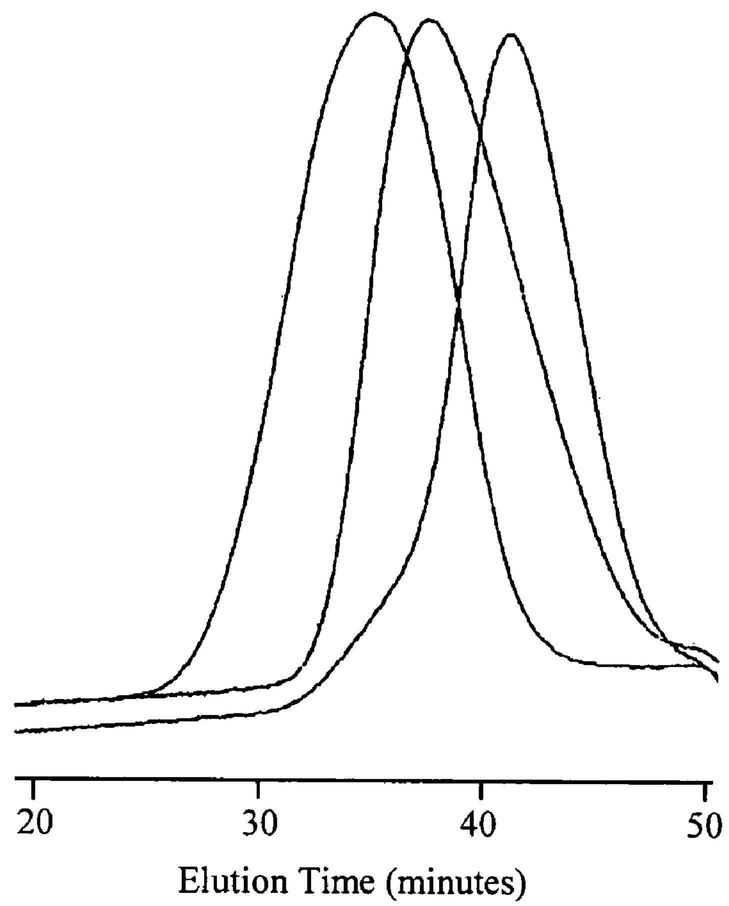
FIG. 1 illustrates (top) GPC curves of telechelic PMMA samples (Examples No. 9, 11, and 13), and (bottom) plots of polymer molecular weight vs. monomer conversion (runs 1-5) using [oxygen]/[borane]=⅓ initiator system.
Figure 1:
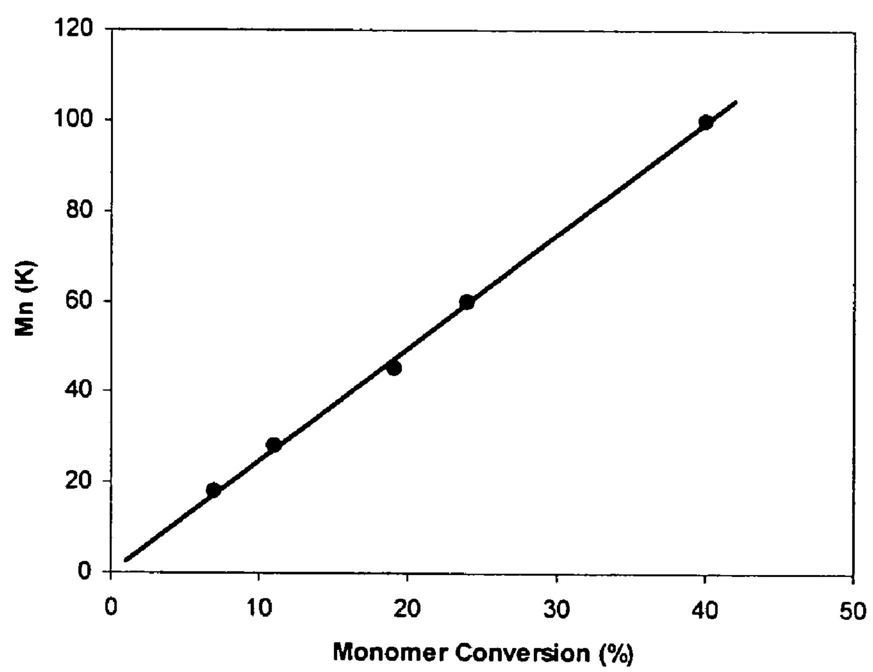

The present invention stems from the discovery that polymerization of vinyl monomers with a boron containing initiator results in a polymer having a boron residue at one end of the polymer, which can be converted to multiple functional groups. The synthesis of well-defined telechelic polymers, with precise functionality and molecular weight, is an important subject in polymer science due to the desire of using such polymers as starting materials, i.e., prepolymers or macromers, to prepare products with custom physical properties. The issue is particularly of interest in free radical polymerization because it is a preferred industrial process for producing vinyl polymers.

In addition, free radical initiators are useful with a broad range of vinyl monomers, including monomers containing polar groups. As used herein a vinyl monomer means a compound having at least one unsaturated carbon-carbon double bond, which is susceptible to polymerization. A free radical polymerizable monomer is a compound susceptible to free radical polymerization either with itself or other monomers and includes vinyl monomers.

In practicing certain embodiments of the present invention, a telechelic polymer comprising a polymer segment derived from one or more free radical polymerizable monomer and having two functional groups at the same chain end can be obtained. In an embodiment of the present invention a telechelic polymer can be obtained having the following formula:

$$(X'')(X')R''\text{-}R'\text{-}PS \quad (I)$$

in which PS represents a polymer segment, R' is an ether linkage, or a substituted or unsubstituted linear or branched alkyl, or alkyl ether linkage, R" is a substituted or unsubstituted linear, branched, or cyclic alkyl group, and X' and X" can be a primary or secondary functional group.

In practicing embodiments of the present invention, the polymer segment is derived from one or more free radical polymerizable monomer, i.e., the polymer segment is the product of the polymerization of the monomers. The polymer segment can be a homopolymer or copolymer prepared by borane-mediated living radical polymerization of vinyl monomers. Such monomers include $C_2$ to $C_{18}$ monomers having linear, branched or cyclic structures. The term "copolymer" is meant to include polymers containing groups or units derived from two or more monomers with random, diblock, and multi-block microstructures. Thus, as used herein, the term "copolymer" is meant to include copolymers, terpolymers, tetrapolymers, etc. The average molecular weight (i.e. number average molecular weight) of the polymer segment is typically above 300 g/mole. Preferably, the number average molecular weight of the polymer segment is from about 500 to about 1,000,000 g/mole, and most preferably from about 1,000 to about 300,000 g/mole. Preferably, the polymer segment, and consequently the telechelic polymer, has a relatively narrow molecular weight distribution, e.g., no more than 5 and preferably less than 3.

The free radical polymerizable monomers contemplated for use in the present invention include, for example, vinyl monomers and dienes, such as vinyl halides, vinyl alcohols, vinyl ethers, vinyl esters, vinyl pyrrolidones, vinyl alkyls, vinyl aromatics, i.e. styrenes, acrylates, acrylic acids, acrylonitriles, and their cyclic form. The monomers can be substituted with one or more halogen, alkyl or polar group. Examples of such monomers include, without limitation: methyl methacrylate, ethyl methacrylate, butyl methacrylate, octyl methacylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, acrylonitrile, acrylamide, vinyl chloride, 2,2,2-trifluoroethyl methacrylate, 2,2,3,3,3-pentafluoropropyl methacrylate, 2-(perfluorobutyl)ethyl methacrylate, 3-(perfluorobutyl)-2-hydroxypropyl methacrylate, 3-(perfluorohexyl)-2-hydroxypropyl methacrylate, 3-(perfluorooctyl)-2-hydroxypropyl methacrylate, 3-(perfluoro-3-methylbutyl)-2-hydroxypropyl methacrylate, 3-(perfluoro-5-methylhexyl)-2-hydroxypropyl methacrylate, 3-(perfluoro-7-methyloctyl)-2-hydroxypropyl methacrylate, 2-(perfluorohexyl)ethyl methacrylate, 2-(perfluorooctyl)ethyl methacrylate, 2-(perfluorodecyl)ethyl methacrylate, 2-(perfluoro-3-methylbutyl)ethyl methacrylate, 2-(perfluoro-5-methylhexyl)ethyl methacrylate, 2-(perfluoro-7-methyloctyl)ethyl methacrylate, 1H,1H,3H-tetrafluoropropyl methacrylate, 1H,1H,3H-hexafluorobutyl methacrylate, 1H,1H,5H-octafluoropentyl methacrylate, 1H,1H,7H-dodecafluoroheptyl methacrylate, 1H,1H,9H-hexadecafluorononyl methacrylate, 1H-1-(trifluoromethyl)trifluoroethyl methacrylate, 2,2,2-trifluoroethyl acrylate, 2,2,3,3,3-pentafluoropropyl acrylate, 2-(perfluorobutyl)ethyl acrylate, 3-perfluorobutyl-2-hydroxypropyl acrylate, 2-(perfluorohexyl_ethyl acrylate, 3-perfluorohexyl-2-hydroxypropyl acrylate, 2-(perfluorooctyl)ethyl acrylate, 3-perfluorooctyl-2-hydroxypropyl acrylate, 2-(perfluorodecyl)ethyl acrylate, 2-(perfluoro-3-methylbutyl)ethyl acrylate, 3-(perfluoro-3-methylbutyl)-2-hydroxypropyl acrylate, 2-(perfluoro-5-methylhexyl)ethyl acrylate, 3-(perfluoro-5-methylhexyl)-2-hydroxypropyl acrylate, 2-(perfluoro-9-methyloctyl)ethyl acrylate, 3-(perfluoro-7-methyloctyl)-2-hydroxypropyl acrylate, 1H, 1H, 3H-tetrafluoropropyl acrylate, 1H,1H,3H-hexafluorobutyl acrylate, 1H,1H,5H-octafluoropentyl acrylate, 1H,1H,7H-dodecafluoroheptyl acrylate, 1H,1H,9H-hexadecafluorononyl acrylate, 1H-1-(trifluoromethyl)trifluoroethyl acrylate, vinyl fluoride, vinylidene difluoride, 1-fluoro-1-chloro-ethylene, 1-chloro-2,2-difluoroethylene, chlorotrifluoroethylene, trifluoroethylene, tertrafluoroethylene, hexafluoropropene, perfluoromethyl vinylether, styrene, alpha-methyl styrene, substituted styrene, trimethoxyvinylsilane, triethoxyvinylsilane and the like. These radical polymerizable monomers can be used either singly, sequentially, or as a combination of two or more monomers simultaneously.

In practicing embodiments of the present invention, a telechelic polymer is prepared by initiating polymerization of a free radical polymerizable monomer. The initiator is preferably a cycloborane initiator, in which all three C—B bonds are part of the cyclic structure, as illustrated below:

(II)

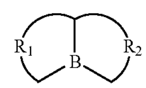

(III)

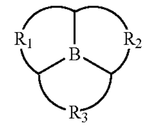

In the formulae depicted above, $R_1$, $R_2$, and $R_3$, are independently linear or branched alkyl groups with a carbon count of from 2 to about 15, and preferably from 2 to 10. Each pair of $R_1$, $R_2$, and $R_3$ can be chemically bridged to each other with a linking group shared by the two alkyl groups to form a cyclic ring structure that includes the boron atom.

Particularly suitable cycloborane initiators include: 8-boraindane (IV), 9-boradecalin (V), 1-boraadamantane (VI), and perhydro-9b-boraphenalene (VII), which are shown below.

(IV)

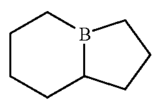

-continued (V)

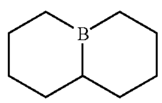

(VI)

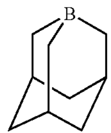

(VII)

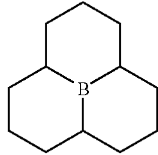

The preparation of these compounds, as well as other boron containing compounds, are know in the art as reported by Brown et al. Tetrahedron 33, 2331, 1977).

In practicing the present invention the cycloborane initiator, one or more types of radical polymerizable monomer and oxygen are combined. In an embodiment of the present invention, the initiator and monomer are combined first in an oxygen free atmosphere. However, it is also contemplated that the components can be combined in an oxygen atmosphere and the amount of oxygen adjusted until the desired ratio of components are achieved. After combining a cycloborane initiator and one or more free radical polymerizable monomers in a solvent or in bulk, a controlled amount of oxygen can be reduced or introduced to the mixture to form a mono-oxidized borane compound. It is believed that this oxidized borane can in situ initiate living radical polymerization to produce vinyl polymers, including homopolymers and copolymers. The following scheme illustrates the believed mechanism of in situ oxidation and polymerization process involving a clycoborane initiator with an acrylic monomer in the presence of oxygen.

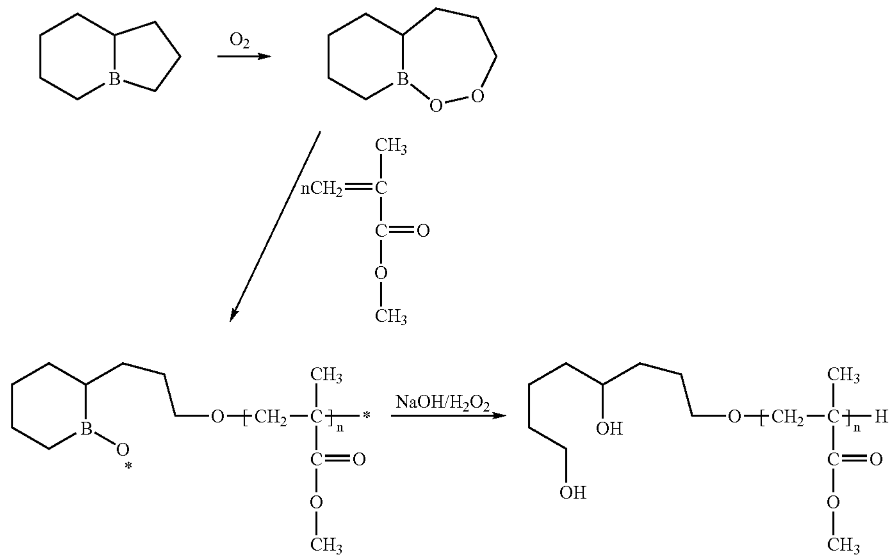

The example provided above shows the preparation of telechelic polymethylmethacrylate (PMMA) having a PMMA segment, where n is the number of repeat units, and with two terminal OH groups at the beginning of polymer chain. The scheme shows the polymerization of the polymer segment by using the 8-boraindane (IV) initiator.

As disclosed in previous publications, it is believed that a trialkylborane ($BR_3$) is initially oxidized at one of the there B—C bonds to form a peroxide compound, i.e., $R_2$B—O—O—C, when exposed to a stoichmetric amount of oxygen at ambient temperature. See Chung et al., U.S. Pat. Nos. 5,286,800, 5,401,805, and 6,420,502*; J. Am. Chem. Soc.,* 118, 705 (1996); *J. Am. Chem. Soc.,* 121, 6763 (1999). Without being bound by any theory, it is believed that in the presence of suitable monomers, the B—O—O—C species that is formed further decomposes at ambient temperature to an alkoxyl radical (C—O*) and a borinate radical (B—O*). The alkoxyl radical is believed active in initiating polymerization of monomers. On the other hand, the borinate radical (B—O*) is believed too stable to initiate polymerization due to the back-donating of electrons to the empty p-orbital of boron. However, this “dormant” borinate radical may form a reversible bond with the radical at the growing chain end to prolong the lifetime of the propagating radical.

In this 8-boraindane (IV) case (shown in the above scheme), one of three cyclic B—C bonds is oxidized and initiates radical MMA polymerization, and the partially oxidized cycloborane residue remains bonded to the beginning of polymer chain, despite the continuous growth of the polymer chain. After terminating the living polymerization, the two unreacted cyclic B—C bonds in the borane residue can be completely interconverted to functional groups, such as two OH groups by $NaOH/H_2O_2$ reagent. The resulting PMMA polymer has two OH groups located at the beginning of polymer chain, as well as having a controlled molecular weight and narrow molecular weight distribution. The chemistry is applicable to many monomers, including fluoro-monomers. This new class of diol macromonomer can be used to introduce additional physical properties into a material made by condensation processes, such as polyurethanes and polyesters.

The combination of a cycloborane initiator, monomer and oxygen is useful for preparing homoploymers and random copolymers containing two reactive terminal functional groups at the same polymer chain end. It is also useful for preparing telechelics having a block copolymer structure by means of sequential monomer addition, with similar telechelic polymer chain end structure, such as in living polymerization techniques. In other words, after completing the polymerization of a first monomer to the extent desired to form a first polymer "block", a second monomer is introduced into the reaction mass to effect polymerization of the second monomer to form a second polymer "block" that is attached to the end of the first block. After terminating the living polymerization, the partially oxidized borane residue located at the beginning of polymer chain can be completely interconverted to two reactive functional groups. Using this sequential addition process, a broad range of diblock, triblock, etc. copolymers can be prepared, which have the following polymer segment formula:

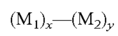

$(M_1)_x$—$(M_2)_y$

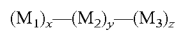

Figure 3:
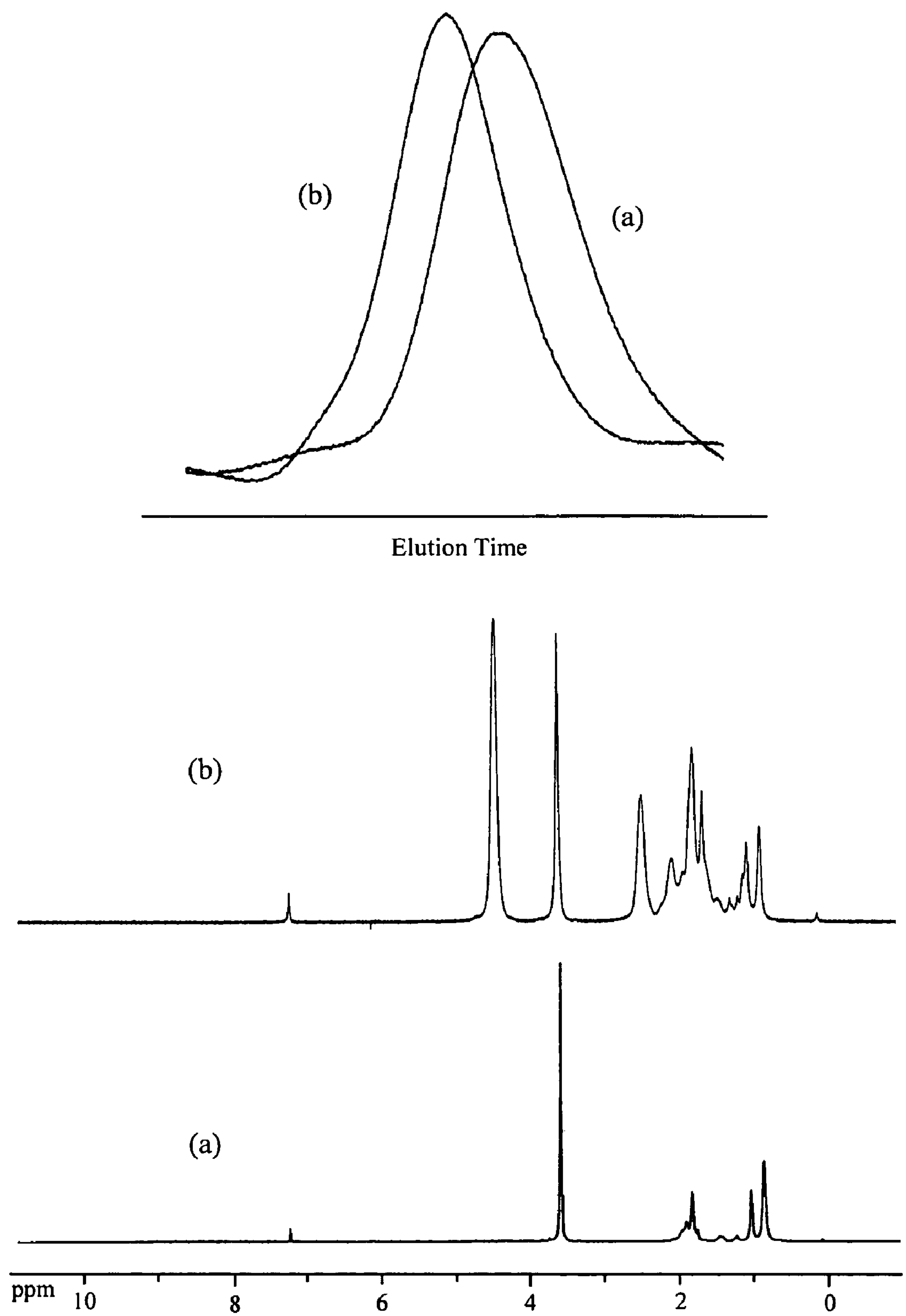
FIG. 3 compares (top) GPC and (bottom) $^{1}H$ NMR spectra between (a) PMMA and (b) PMMA-b-PTFEA diblock Copolymer Prepared by Sequential Monomer Addition Using 8-Bora-indane/$O_2$ initiator.

$(M_1)_x$—$(M_2)_y$—$(M_3)_z$ where $M_1$, $M_2$ and $M_3$ are the same or different monomer units chosen from free radical polymerizable monomers. It is understood that the polymer segments shown above have at least two function groups on a terminus of the polymer chain. These radical polymerizable monomers can be used either singly or as a combination of two or more monomers. The numbers x, y and z represent the number of repeating monomer units in each polymer block, and typically x, y and z, independently, would be from about 10 to about 100,000. Preferably, x, y, and z, independently, would be from about 20 to about 30,000, most preferably from about 30 to about 10,000. Basically, similar living radical polymerization reactions occur sequentially, first with the first monomer (or mixture of monomers), then with the second monomer (or mixture of monomers), then with the third monomer (or mixture of monomers), and so on, to form diblock, triblock, etc. As shown in FIG. 3, a telechelic poly(methyl methacrylate-b-poly(trifluoroethylacrylate) diblock copolymer (graph b) exhibited almost twice the molecular weight of a poly (methyl methacrylate) homopolymer (graph a), without changing the narrow molecular weight distribution. The copolymer composition was basically controlled by monomer feed ratio.

In practicing an embodiment of the present invention, the borane residue located at the polymer chain can be completely converted to two reactive functional groups. In Formula I, R' and R" are, in one form or another, the fragments of the borane initiator. During initiation, one of the carbon-boron bonds is believed broken and eventually the carbon atom forms part of the polymer chain end. After conversion of the boron residue, the remaining carbon fragment of the initiator is believed to be retained on the polymer chain. Based on the cycloborane initiators shown in formulae (IV) through (VII), for example, R' can be O, or —$CH_2O$—, and R" can be a $C_7$ alkyl group or a $C_8$ alkyl ring with or without methylene groups attached to functional groups. Thus, R' and R" in formula (I) above, can be a combination of the $R_1$, $R_2$, and $R_3$ groups of the initiator of formulae (II) and (III) and R' and R" are intended to include such groups. In an embodiment of the present invention, R' is an ether linkage, or a substituted or unsubstituted linear or branched alkyl, or alkyl ether linage and R" is a substituted or unsubstituted linear, branched, or cyclic alkyl group, such as a $C_{1-15}$ substituted or unsubstituted linear, branched, or cyclic alkyl group. Preferably R" is a $C_{2-10}$ substituted or unsubstituted linear, branched, or cyclic alkyl group. R' and R" can also be chemically linked together to form a long linear structure or with a direct chemical bond between the two alkyl groups or to form a cyclic ring structure.

The terminal functional groups (X' and X") can be a primary or secondary functional group. These groups include hydroxyl, amino, aldehyde, anhydride, halogen, carboxylic acid, etc. end groups. The functional groups are formed by converting the borane residue on the end of the polymer segment. Such borane interconversion reactions are known in the art as for example those disclosed by H. C. Brown, "Organic Synthesis via Boranes," Wiley-Interscience. For example, a telechelic polymer containing two OH terminal groups can be prepared by oxidizing the borane residue with a mixture of NaOH and peroxide. Similarly, telechelic polymers containing terminal amino functionality may be prepared by reaction of the borane-terminating polymer with $NH_2OSO_3R$; polymers containing aldehyde functionality may be prepared by reaction of the borane-terminating polymer with a mixture of CO and $K(i\text{-}C_3H_7O)_3BH$; and polymer containing iodine functionality may be prepared by reaction of the borane-terminating polymer with a solution of NaI/chloramine-T-hydrate. In an embodiment of the present invention X is selected from the group consisting of OH, $NH_2$, COH, COOH, Br, I, and succinic anhydride. Any functional group capable of being derived from a borane is contemplated and included herein.

EXPERIMENTAL

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

EXAMPLE 1

Synthesis of 1,3,7-Octatriene 1,3,7-Octatriene was synthesized via dimerization of butadiene aided by phenol in the presence of a Pd catalyst. Under an argon (Ar) atmosphere, to a 1 liter flask equipped with a magnetic stirrer was added 100 g (1.06 mol) of phenol, 4.64 g (0.004 mol) of sodium phenoxide, 0.25 g of π-allylpalladium chloride and 400 ml of chloroform. After the flask was cooled down to −80° C., it was charged with 150 g of butadiene. The solution was gradually warmed up to room temperature within 1 hour. The stirring was continued overnight. Chloroform was then removed completely under vacuum at room temperature resulting in a pale suspension. To this suspension was added 8.0 g (0.03 mol) of triphenylphosphine followed by stirring at 100° C. for 1 hour. About 76 g of 1,3,7-octatriene was then carefully distilled from the mixture by fractional distillation at about 120° C. to 125° C.

EXAMPLE 2

Synthesis of 8-Boraindane

Under Ar atmosphere at 0° C., 21.6 g (0.2 mol) of 1,3,7-octatriene in 50 ml of THF solution was added dropwise with 200 ml (1.0 M) of borane THF complex in THF solution. After the addition was complete, stirring continued for 1 hour at 0° C. Then the mixture was refluxed for 1 hour before THF was removed completely under vacuum at room temperature. The attained white solid was heated to 210° C. for 3 hours then 9.6 g of 9-boraindane (yield: 41%) was distilled from the mixture at about 50° C. to 60° C. (0.3 mmHg). The spectra data were as follows: 1H-NMR (25° C. in $CDCl_3$) δ 0.08~1.6 ppm (m); 11B-NMR (25° C. in $CDCl_3$) δ 91.14 ppm (s); 13C-NMR (25° C. in $CDCl_3$) δ 21.9 ppm (b, CH2-B), δ 25.6 ppm (s, CH2), δ 26.3 ppm (s, CH2), δ 27.4 ppm (b, CH2-B), δ 28.4 ppm (s, CH2-B), δ 31.6 ppm (s, CH2), δ 34.4 ppm (s, CH2), δ 42.4 ppm (b, CH—B).

EXAMPLE 3

Synthesis of 1-Boraadamantane THF Complex

Under Ar atmosphere and vigorous stirring, to 100 ml (1.0M) of allylmagnesium bromide in diethyl ether was added dropwise 4.8 g of borontrifloride diethyl ether. After refluxing for 30 min, the mixture was permitted to stand over night. The solution layer was transferred to another flask under Ar. The diethyl ether was removed by distillation at 60° C. under normal pressure. The triallyl borane was distilled from the mixture under reduced pressure to yield 2.7 g (60%). To a 100 ml flask preheated to 130° C. was added 2.7 g of triallyl borane. After stirring for 5 min was added 1.4 g of methyl propargyl ether. The mixture was stirred for 1 hour then cooled down to room temperature. To the mixture was added 0.7 ml of methanol and stirred for 15 min after the propene gas evacuated completely. To the remaining oil was added 20 ml (1.0 M) of borane THF complex in THF solution. The mixture was refluxed at 80° C. for 2 hours. The THF was then removed under vacuum at room temperature. The pure 1-boraadamantane THF complex was obtained from the white solid residue via sublimation under vacuum in 2.0 g (yield: 52%). The spectra data were as follows: $^1$H-NMR (25° C. in CDCl3) δ 3.4 ppm (t, 4H, THF CH2-O), δ 2.7 ppm (m, 3H, CH), δ 1.9 ppm (t, 4H, THF CH2), δ 1.1 ppm (m, CH2). 11B-NMR (25° C. in CDCl3) δ 12.58 ppm (s); 13C-NMR (25° C. in CDCl3) δ 24.1 ppm (s, THF CH2), δ 30.4 ppm (b, CH2-B), δ 34.9 ppm (s, CH), δ 40.8 ppm (s, CH2), δ 68.2 ppm (s, THF CH2—O).

EXAMPLE 4

Synthesis of Telechelic PMMA with Two Terminal OH Groups by Bulk Polymerization of MMA Using 8-Bora-Indane/$O_2$ Initiator In a 100 ml flame-dried flask, 10.0 ml (100 mmol) of MMA (purified by distillation over $CaH_2$) and 140 mg (1.2 mmol) of 8-bora-indane were introduced under argon. After injecting 10 ml of $O_2$ (0.8 mmol), the solution was mixed by shaking the flask vigorously for about 5 minutes. The system was then kept at room temperature for another 60 min before adding 20 ml of acetone to reduce the solution viscosity. The solution was then poured into 200 ml of well stirred methanol to quench the polymerization and precipitate PMMA polymer. To assure complete oxidation of all borane moieties, the isolated PMMA polymer was then re-dissolved in 20 ml THF before adding 0.2 ml (6N) NaOH solution, followed by dropwise 0.4 ml, 33% $H_2O_2$ at 0° C. The resulting mixture was heated up to 50° C. for 1 hour to complete the oxidation. After cooling to room temperature, the solution was purred into 200 ml of well stirred methanol. The precipitated telechelic PMMA polymer was collected, washed, and dried in vacuum at 60° C. for 2 days. The overall polymer yield was about 80%, and the polymers molecular weight determined by Gel Permeation Chromatography (GPC) was Mn=20,300 g/mole and Mw=68,500 g/mole. The terminal OH groups were examined by $^1$H and $^{13}$C NMR-DEPT 135 spectra.

EXAMPLES 5-13

Synthesis of Telechelic PMMA with Two Terminal OH Groups by Bulk Polymerization of MMA Using 8-Bora-Indane/$O_2$ Initiator In a series of examples, the similar reaction conditions described in Example 4 were carried out to prepare telechelic PMMA polymers having various molecular weights, except the reaction time was systematically increased from 10 min to 20 min, 40 min, 60 min, and 90 min, respectively. All polymers were also treated with NaOH and $H_2O_2$ to assure complete oxidation of borane moieties. The resulting telechelic PMMA polymers having two terminal OH groups were characterized by Gel Permeation Chromatography (GPC) and $^1$H and $^{13}$C NMR-DEPT measurements. FIG. 1 GPC curves of telechelic PMMA samples (Examples No. 9, 11, and 13), and a plot of polymer molecular weight vs. monomer conversion (Examples No. 9-13) using ⅓ of (oxygen)/(borane) mole ratios, respectively. All the experimental conditions and results for the series of examples are summarized in Table 1, where Mn represents number average molecular weight, Mw represents the weight average molecular weight, and PDI represents the polydispersity index.

TABLE 1

A summary of telechelic PMMA polymers prepared by 8-bora-indane/$O_2$

| Example No. | Oxygen (ml) | Reaction Time (min) | Monomer Conversion (%) | Mn (g/mol) | Mw (g/mol) | PDI (Mw/Mn) |
|---|---|---|---|---|---|---|
| 5 | 0.8 | 20 | 22 | 15,300 | 34,400 | 2.2 |
| 6 | 0.8 | 40 | 42 | 18,600 | 51,200 | 2.8 |
| 7 | 0.8 | 60 | 63 | 20,300 | 68,500 | 3.4 |
| 8 | 0.8 | 90 | 80 | | | |
| 9 | 0.4 | 10 | 7.0 | 18,000 | 42,000 | 2.3 |
| 10 | 0.4 | 20 | 11.0 | 28,000 | 60,000 | 2.1 |
| 11 | 0.4 | 40 | 19.0 | 45,000 | 76,000 | 1.8 |
| 12 | 0.4 | 60 | 24.0 | 60,000 | 110,000 | 1.7 |
| 13 | 0.4 | 90 | 40.0 | 100,000 | 160,000 | 1.6 |

EXAMPLES 14-28

Synthesis of Telechelic PMMA with Two Terminal OH Groups by Bulk Polymerization of MMA Using 8-Bora-Indane/$O_2$ Initiator In another comparative series of examples, the similar experimental procedures described in Example 4 were carried out to prepare telechelic PMMA polymers at ambient temperature for 90 min by using 70 mg (0.6 mmol) 8-bora-indane initiator, except some polymerization parameters were systematically varied in terms of the amount of monomer and oxygen. After polymerization, all polymers were also treated with NaOH and $H_2O_2$ to assure complete oxidation of borane moieties. The resulting telechelic PMMA polymers having two terminal OH groups were characterized by Gel Permeation Chromatography (GPC) and $^1$H and $^{13}C$ NMR-DEPT measurements. Table 2 summarizes some of the experimental conditions and results for the series of examples.

TABLE 2

A summary of MMA bulk polymerization by 8-bora-indane/$O_2$

| Example No. | MMA (ml) | O2 (ml) | Polymer Yield (%) |
|---|---|---|---|
| 14 | 5 | 1.0 | 18 |
| 15 | 5 | 2.0 | 24 |
| 16 | 5 | 3.0 | 22 |
| 17 | 50 | 3.0 | 14 |
| 18 | 5 | 5.0 | 40 |
| 19 | 5 | 7.0 | 60 |
| 20 | 50 | 7.0 | 25 |
| 21 | 5 | 9.0 | 78 |
| 22 | 50 | 9.0 | 36 |
| 23 | 5 | 10.0 | 80 |
| 24 | 5 | 11.0 | 67 |
| 25 | 5 | 13.0 | 34 |
| 26 | 50 | 13.0 | 22 |
| 27 | 5 | 15.0 | 16 |
| 28 | 50 | 15.0 | 18 |

EXAMPLES 29-34

Synthesis of Telechelic PMMA with Two Terminal OH Groups by Solution Polymerization of MMA Using 8-Bora-Indane/$O_2$ Initiator In a 150 ml flame-dried flask, 50 ml of THF, 5.0 ml (50 mmol) of MMA, and 70 mg (0.6 mmol) of 8-bora-indane were introduced under argon. After injecting 5 ml of $O_2$ (0.2 mmol), the solution was mixed by shaking the flask vigorously for about 5 minutes. The solution was then kept at room temperature for various times (0.5 hr, 1.0 hr, 2.0 hr, 5.0 hr, 10.0 hr, 15.0 hr, 20 hr) before adding 10 ml of acetone to reduce the solution viscosity. The solution was then poured into 200 ml of well stirred methanol to quench the polymerization reaction and precipitate the PMMA polymer. To assure complete oxidation of all borane moieties, the isolated PMMA polymer was then re-dissolved in 20 ml THF before adding 0.1 ml (6N) NaOH solution, followed by dropwise 0.2 ml, 33% $H_2O_2$ at 0° C. The resulting mixture was heated up to 50° C. for 1 hour to complete the oxidation. After cooling to room temperature, the solution was purred into 200 ml of well stirred methanol. The precipitated telechelic PMMA polymer was collected, washed, and dried in vacuum at 60° C. for 2 days. The resulting telechelic PMMA polymers having two terminal OH groups were characterized by Gel Permeation Chromatography (GPC) and $^1H$ and $^{13}C$ NMR-DEPT measurements. Table 3 summarizes some experimental results for the series of examples.

TABLE 3

A summary of MMA polymerization in THF solvent by 8-bora-indane/$O_2$

| Example No. | Reaction Time (hr) | Polymer Yield (%) | Mn (g/mole) | Mw (g/mole) | PDI (Mw/Mn) |
|---|---|---|---|---|---|
| 29 | 0.5 | 2.0 | 11,400 | 18,000 | 1.5 |
| 30 | 1.0 | 4.0 | | | |
| 31 | 2.0 | 6.0 | | | |
| 32 | 5.0 | 10.0 | 26,000 | 51,000 | 1.9 |
| 33 | 10.0 | 17.0 | 36,000 | 77,000 | 2.1 |
| 34 | 20.0 | 30.0 | 47,000 | 110,000 | 2.3 |

EXAMPLES 35-39

Synthesis of Telechelic PMMA with Two Terminal OH Groups by Solution Polymerization of MMA Using 8-Bora-Indane/$O_2$ Initiator In a series of examples, the similar solution polymerization described in Examples 29-34 were carried out in benzene solvent to prepare telechelic PMMA polymers, except the amount of benzene (0.5 ml, 5 ml, 15 ml, 35 ml, 55 ml) used in the reaction. Table 4 summarizes the yields of telechelic PMMA polymers formed during the polymerization under each MMA concentration (M=mole/liter).

TABLE 4

A summary of MMA polymerization in benzene solvent by 8-bora-indane/$O_2$

| Example No. | MMA (M) | Conversion (%) 1.5 hr | Conversion (%) 5.0 hr | Conversion (%) 10.0 hr | Conversion (%) 20 hr |
|---|---|---|---|---|---|
| 35 | 9.36 | 80 | 94 | 95 | 96 |
| 36 | 4.68 | 25 | 37 | 46 | 56 |
| 37 | 2.34 | 18 | 28 | 36 | 46 |
| 38 | 1.17 | 12 | 24 | 30 | 38 |
| 39 | 0.78 | 10 | 20 | 24 | 30 |

EXAMPLE 40

Synthesis of Telechelic Poly(T-Butyl Acrylate) with Two Terminal OH Groups by Bulk Process Using 8-Bora-Indane/$O_2$ Initiator In a 100 ml flame-dried flask, 10.0 ml of t-butyl acrylate (purified by distillation over $CaH_2$) and 140 mg of 8-bora-indane were introduced under argon. After injecting 10 ml of $O_2$, the solution was mixed by shaking the flask vigorously for about 5 minutes to initiate the polymerization reaction. The reaction was then maintained at room temperature for another 10 min before exposing to air to stop the polymerization and oxidize all borane moieties. The solid polymer was dissolved in 60 ml THF solvent before pouring into 200 ml of well stirred methanol to precipitate polymer. The precipitated telechelic poly(t-butyl acrylate) was collected, washed, and dried in vacuum at 60° C. for 2 days. The overall polymer yield was about 90%, and the polymers molecular weight determined by Gel Permeation Chromatography (GPC) was Mn=31,000 g/mole and Mw=145,000 g/mole. The terminal OH groups were examined by $^1H$ and $^{13}C$ NMR-DEPT 135 spectra.

EXAMPLE 41

Figure 2:
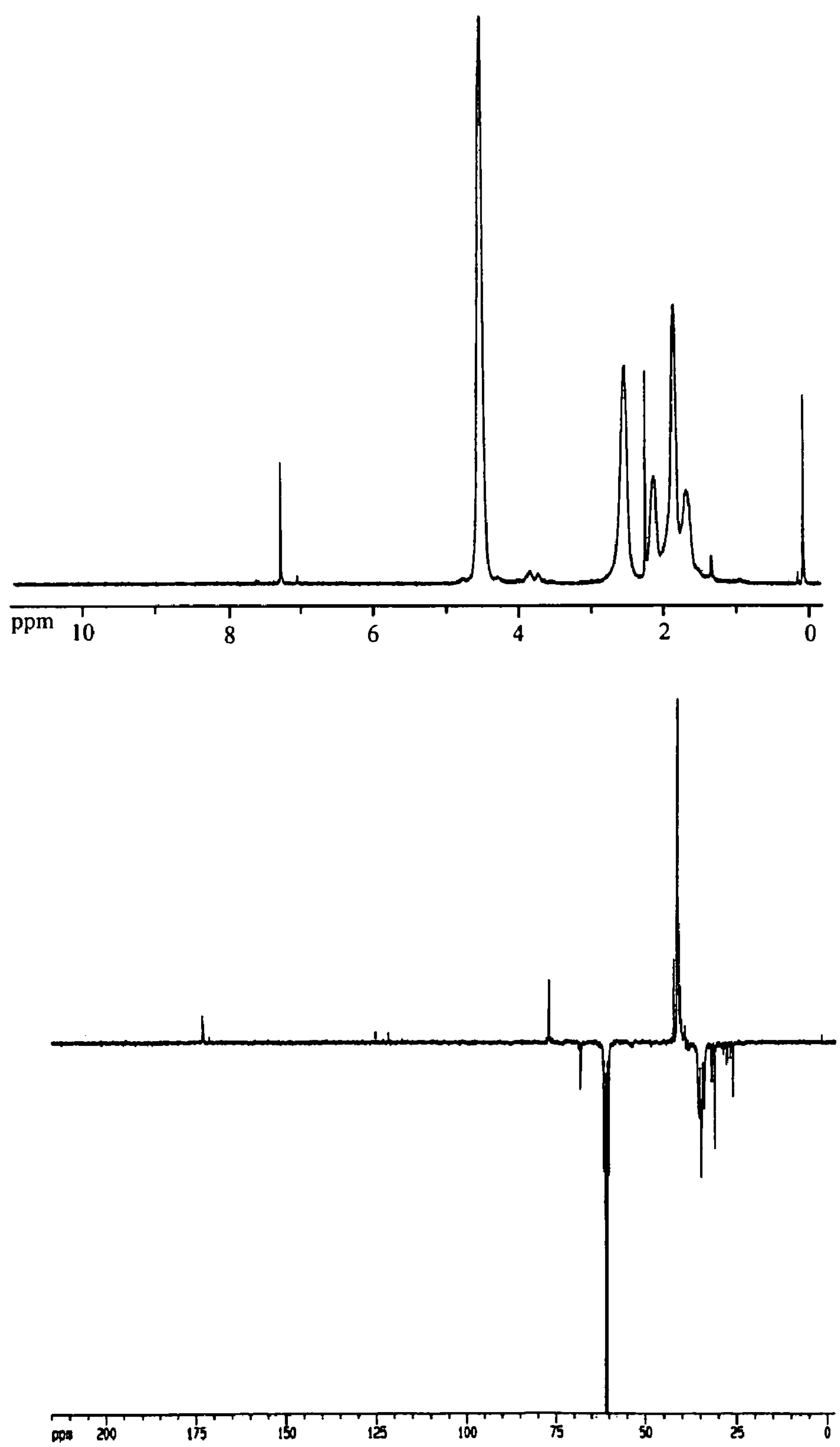
FIG. 2 illustrates (top) $^{1}H$ and (bottom) $^{13}C$ NMR-DEPT 135 spectra of poly(trifluoroethylacrylate) prepared by 8-bora-indane/$O_2$ in benzene at 0° C.

Synthesis of Telechelic Poly(Trifluoroethyl Acrylate) with Two Terminal OH Groups by Bulk Process Using 8-Bora-Indane/$O_2$ Initiator The procedure of Example 36 was followed, except that 2',2',2'-trifluoroethyl acrylate (TFEA) monomer was used instead of t-butyl acrylate. The yield of telechelic poly (trifluoroethyl acrylate) was about 95% with 10 min polymerization time. GPC shows the polymer molecular weight (Mn=23,000 g/mole and Mw=58,000 g/mole). FIG. 2 shows $^1H$ and $^{13}C$ NMR-DEPT 135 spectra of the resulting telechelic poly(trifluoroethyl acrylate) having two terminal OH groups.

EXAMPLES 42-46

Synthesis of Telechelic Poly(Trifluoroethyl Acrylate) with Two Terminal OH Groups by Solution Process Using 8-Bora-Indane/$O_2$ Initiator In a 150 ml flame-dried flask, 40 ml of THF, 5 ml of 2',2',2'-trifluoroethyl acrylate (TFEA) monomer, and 70 mg of 8-bora-indane were introduced under argon. After injecting 5 ml of $O_2$, the solution was mixed by shaking the flask vigorously for about 5 minutes. The solution was then kept at room temperature for various times (2 hr, 4 hr, 6 hr, 8 hr, and 10 hr, respectively) before exposing the solution to air that stops the reaction and oxidized all borane moieties. The polymer solution was then poured into 200 ml of well stirred methanol to precipitate the polymer. The precipitated telechelic poly(trifluoroethyl acrylate) was collected, washed, and dried in vacuum at 60° C. for 2 days, then was characterized by Gel Permeation Chromatography (GPC) and $^1H$ and $^{13}C$ NMR-DEPT measurements. All the experimental results for the series of examples are summarized in Table 5.

TABLE 5

A summary of TFEA polymerization by 8-bora-indane/$O_2$ in THF

| Example No. | Time (hr) | Conversion (%) | Mn (g/mole) | Mw (g/mole) | PDI (Mw/Mn) |
|---|---|---|---|---|---|
| 42 | 2.0 | 12.0 | 7,000 | 12,000 | 1.8 |
| 43 | 4.0 | 19.0 | | | |
| 44 | 6.0 | 40.0 | 25,000 | 49,000 | 1.9 |
| 45 | 8.0 | 52.0 | | | |
| 46 | 10 | 60.0 | 33,000 | 56,000 | 1.6 |

EXAMPLES 47-60

Synthesis of Telechelic PMMA with Two Terminal OH Groups by Bulk Polymerization of MMA Using 1-Boraadamantane/$O_2$ Initiator In a series of examples, 50 ml of MMA (purified by distillation over $CaH_2$) and 350 mg of 1-boraadamantane/THF complex were mixed in a 150 ml flame-dried flask in a dry box under argon atmosphere. The mixed solution was injected into several test tubes capped with septa, with 6 ml of solution in each tube. The test tubes were then moved out the dry box and injected with 1.2 ml of $O_2$ into each tube. After vigorously shaking each test tube, the solution was then kept at a certain temperature for a certain time (shown in Table 6) before stopping the polymerization by pouring the solution into 50 ml methanol and precipitating PMMA polymer. To assure complete oxidation of all borane moieties, the isolated PMMA polymer was then re-dissolved in 20 ml THF before adding 0.5 ml (6N) NaOH solution, followed by dropwise 1 ml, 33% $H_2O_2$ at 0° C. The resulting mixture was based up to 50° C. for 1 hour to complete the oxidation. After cooling to room temperature, the solution was poured into 200 ml of well stirred methanol. The precipitated telechelic PMMA polymer was collected, washed, and dried in vacuum at 60° C. for 2 days. The resulting telechelic PMMA polymers having two terminal OH groups were characterized by Gel Permeation Chromatography (GPC) and $^1H$ and $^{13}C$ NMR-DEPT measurements. Table 6 summarizes the experimental conditions and results for the series of examples.

TABLE 6

A summary of telechelic PMMA polymers prepared by 1-boraadamantane/$O_2$ initiator.

| Example No. | Reaction Temp. (° C.) | Reaction Time (min) | Polymer Yield (%) | Mn (g/mole) | Mw (g/mole) | PDI (Mw/Mn) |
|---|---|---|---|---|---|---|
| 47 | 0 | 30 | 2.0 | 59,100 | 365,000 | 6.1 |
| 48 | 0 | 60 | 4.0 | | | |
| 49 | 0 | 120 | 8.6 | | | |
| 50 | 0 | 150 | 12 | 53,700 | 289,000 | 5.4 |
| 51 | 25 | 30 | 10 | 31,000 | 104,000 | 3.4 |
| 52 | 25 | 60 | 14 | | | |
| 53 | 25 | 120 | 16 | 50,700 | 225,000 | 4.4 |
| 54 | 25 | 300 | 20 | 64,000 | 320,000 | 5.0 |
| 55 | 25 | 600 | 25 | 93,000 | 662,000 | 7.1 |
| 56 | 25 | 1800 | 53 | 163,000 | 1,030,000 | 6.7 |
| 57 | 50 | 30 | 20 | 38,000 | 143,000 | 3.7 |
| 58 | 50 | 150 | 28 | 61,000 | 503,000 | 8.1 |
| 59 | 50 | 200 | 32 | 88,000 | 744,000 | 8.4 |
| 60 | 50 | 300 | 40 | 113,000 | 860,000 | 7.6 |

EXAMPLE 61

Synthesis of Poly(Methyl Methacrylate-B-Trifluoroethyl Acrylate) Diblock Copolymer Having Two Terminal OH Groups in the Beginning of the PMMA Chain.

In a flame-dried 50 ml flask, 5.0 ml (50 mmol) of MMA and 70 mg (0.6 mmol) of 9-bora-indane were mixed under argon. To this mixture 5.0 ml of $O_2$ (0.2 mmol) was injected, following by vigorous shaking to assure complete mixing. The system was then kept at room temperature for 20 min, followed by removal of all the volatiles by vacuum distillation. About 5.0 ml of 2',2',2'-trifluoroethyl acrylate (TFEA) was subsequently injected into the system. The mixture was shaken vigorously to dissolve the solid as soon as possible. After complete dissolution, the solution was kept at room temperature for 1 hour before adding 10 ml of acetone to reduce the viscosity and then opening the system to air to oxidize all the borane moieties. The solution was then poured into 200 ml of well stirred methanol. The precipitated telechelic diblock polymer was collected, washed, and dried in vacuum at 60° C. for 2 days. The resulting telechelic poly(methyl methacrylate-b-trifluoroethyl acrylate) diblock copolymer was characterized by Gel Permeation Chromatography (GPC) and $^1H$ and $^{13}C$ NMR-DEPT measurements. FIG. 3 compares $^1H$ NMR spectra and GPC curves between PMMA (Mn=12,400 and Mw=24,000 g/mol) and PMMA-b-PTFEA diblock copolymer (Mn=32,800 and Mw=58,000 g/mol), and both having two terminal OH groups in the beginning of PMMA chain.

EXAMPLE 62

Synthesis of Poly(Trifluoroethyl Acrylate-B-Methyl Methacrylate) Diblock Copolymer Having Two Terminal OH Groups in the Beginning of PTFEA Chain.

The procedure of Example 61 was followed, except the sequence of monomer addition. 2',2',2'-Trifluoroethyl acrylate (TFEA) monomer was added first instead of methyl methacrylate. The resulting telechelic poly(trifluoroethyl acrylate-b-methyl methacrylate) diblock copolymer having two terminal OH groups in the beginning of the PTFEA chain was characterized by Gel Permeation Chromatography (GPC) and $^1$H and $^{13}$C NMR-DEPT measurements. Table 7 compares the molecular weight of the first PTFEA block and the resulting PTFEA-b-PMMA diblock copolymer.

TABLE 7

A summary of PTFEA block and PTFEA-b-PMMA diblock copolymer.

| Example 62 | Mn (g/mole) | Mw (g/mole) | PDI (Mw/Mn) | MMA/TFEA (mol/mol) |
|---|---|---|---|---|
| PTFEA | 41,000 | 78,000 | 1.9 | |
| PTFEA-b-PMMA | 73,000 | 152,000 | 2.1 | 10/8 |

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A polymer segment having a borane residue at one end, wherein said borane residue is selected from the following structures:

(II)

(III)

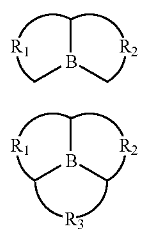

wherein $R_1$, $R_2$, and $R_3$, independently, are linear or branched $C_{1-15}$ alkyl.

2. The polymer segment having a borane residue at one end according to claim 1, wherein the polymer segment is derived from the free radical polymerizable monomers.

3. A telechelic polymer comprising a polymer segment derived from free radical polymerizable monomers and having two functional groups at the same chain end, wherein the polymer segment is derived from one or more acrylic and methacrylic monomers or fluorinated derivatives thereof; vinyl fluoride; vinylidene difluoride; 1-fluoro-1-chloro-ethylene; 1-chloro-2,2-difluoroethylene; chlorotrifluoroethylene; trifluoroethylene; tertrafluoroethylene; hexafluoropropene; or perfluoromethyl vinylether.

4. A telechelic polymer comprising a polymer segment derived from free radical polymerizable monomers and having two functional groups at the same chain end which has the following formula:

(X")(X')R"-R'-PS wherein PS represents a polymer segment having a number average molecular weight above about 500 g/mole, R' is an ether linkage, or a substituted or unsubstituted linear or branched alkyl, or alkyl ether linkage, R" is a substituted or unsubstituted linear, branched, or cyclic alkyl group, and X' and X" are a primary or secondary functional group, wherein the polymer segment is derived from one or more acrylic and methacrylic monomers or fluorinated derivatives thereof; vinyl fluoride; vinylidene difluoride; 1-fluoro-1-chloro-ethylene; 1-chloro-2,2-difluoroethylene; chlorotrifluoroethylene; trifluoroethylene; tertrafluoroethylene; hexafluoropropene; or perfluoromethyl vinylether.

5. The telechelic polymer according to claim 4, wherein X' and X" are selected from the group consisting of: hydroxyl, amino, aldehyde, anhydride, halogen, carboxylic acid, Br, I, and succinic anhydride.

6. The telechelic polymer according to claim 4, wherein PS is derived from two or more monomers with random, diblock, or multi-block microstructures.

7. The telechelic polymer according to claim 4, wherein PS has a molecular weight of from about 1,000 to about 1,000,000 g/mole.

8. The telechelic polymer according to claim 4, wherein PS has a molecular weight of from about 1,000 to about 300,000 g/mole.

9. The polymer segment having a borane residue at one end according to claim 1, wherein the polymer segment is derived from one or more substituted or unsubstituted vinyl halides, vinyl alcohols, vinyl ethers, vinyl esters, vinyl pyrrolidones, vinyl alkyls, vinyl aromatics, acrylates, acrylic acids, acrylonitriles.

10. A material made from the telechelic polymer of claim 3.

* * * * *